United States Patent
Curriston et al.

[15] 3,691,853
[45] Sept. 19, 1972

[54] TORQUE GENERATOR

[72] Inventors: Loren E. Curriston, La Habra; Alden P. Perry, Cypress, both of Calif.

[73] Assignee: North American Rockwell Corporation

[22] Filed: July 27, 1970

[21] Appl. No.: 58,374

[52] U.S. Cl. ................................. 74/5.34
[51] Int. Cl. ............................... G01c 19/02
[58] Field of Search ......... 74/5, 5.34, 5.37; 244/79

[56] References Cited

UNITED STATES PATENTS

| | | |
|---|---|---|
| 1,548,442 | 8/1925 | Chessin..................74/5.34 X |
| 2,811,047 | 10/1957 | Christoph...............74/5.34 X |
| 3,476,129 | 11/1969 | Halstenberg............74/5.34 X |

FOREIGN PATENTS OR APPLICATIONS

| | | |
|---|---|---|
| 657,634 | 3/1938 | Germany....................74/5.34 |

*Primary Examiner*—Manuel A. Antonakas
*Attorney*—L. Lee Humphries, Charles F. Dischler and Dominick Nardelli

[57] ABSTRACT

The features and advantages of a singe-degree of freedom-type of control-movement gyros have been retained within a system having only one pair of rotors by mounting them on a frame to normally rotate about parallel axes and counter to each other, each spin axis is mounted so that the axis can be rotated simultaneously within two mutually perpendicular planes to provide angular momentum to the frame on any axis that lies in a plane perpendicular to the normal position of the spin axes.

5 Claims, 3 Drawing Figures

PATENTED SEP 19 1972 3,691,853

INVENTORS.
LOREN E. CURRISTON
ALDEN P. PERRY

BY Dominick Nardelli

ATTORNEY

TORQUE GENERATOR

FIELD OF INVENTION

This invention relates to gyratory apparatus and more particular to gyroscopic apparatus which generates rotational forces.

BACKGROUND OF INVENTION

Up to now, a torque generator, which can provide torque without creating a counter torque, is comprised of two rotors having identical inertia rotating at the same R.P.M. on parallel spin axes and in opposite directions, and each rotor is mounted in a gimbal. Each gimbal is rotatably mounted in a frame to rotate on a respective axis that is perpendicular to the spin axis and which respective gimbal axes of rotation are parallel to each other. The gimbals are geared together so that when one gimbal rotates in one direction the other gimbal rotates in the counter-direction. Then, when input torque is applied to rotate the gimbal, the frame would rotate about an axis in quadrature or perpendicular with the spin axes and gimbal rotational axes and in a sense according to the direction of the applied torque. The output torque applied to the frame is in accordance with gyro rotors conventionally mounted in only one gimbal and can be much larger than the input torque. Now, when the frame is required to rotate about another axis, another pair of rotors mounted on similar gimbals is needed. This arrangement now allows the frame to rotate about any axis that lies in a plane perpendicular to the normal quiescent position of the spin axes. This feature for controlling the rotation of a frame is disclosed in U.S. Pat. No. 3,280,644.

FEATURES AND OBJECTS OF THE INVENTION

One feature of this invention is to eliminate one pair of rotors without degrading the controllability of the frame.

An object of this invention is to provide a means for rotating the spin axis of only one pair of rotors without degrading the controllability of the frame.

An object of this invention is to provide a means for rotating one pair of rotors to provide angular rotation of a frame on more than one axes, while retaining the functional advantages inherent in the single degree of freedom rotor mounting system of the above-referenced patent.

Another object of this invention is to provide a means for mounting each of a pair of rotors on two gimbals so that each gimbal can be rotated on two crossing axes, while the first gimbal in one of the pairs rotates in a direction counter to the direction of the corresponding gimbal in the other pair, and the second gimbal in the first pair rotates in a similar manner to the corresponding gimbal in the other pair.

BRIEF DESCRIPTION OF THE DRAWINGS

These and other objects and features of advantage would become more apparent after reading the following detailed description of a preferred embodiment of the invention together with the accompanying drawings in which.

OPERATING DESCRIPTION OF THE DRAWINGS

Figure 1:
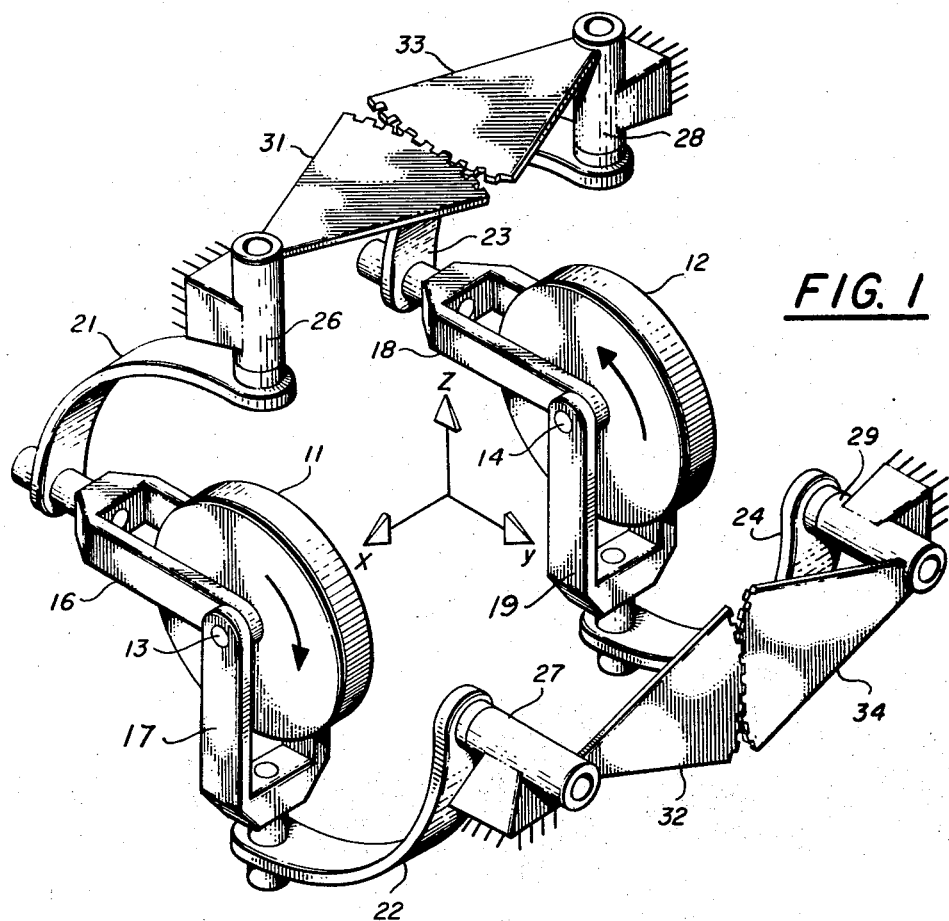
FIG. 1 is a schematic pictorial view of the frame incorporating the invention.

Referring to the drawings and to FIG. 1 in particular, there is shown a schematic which includes the novel features of this invention. There is shown two rotors 11 and 12 mounted on axles 13 and 14, respectively, which in the normal quiescent condition are disposed parallel to each other. As in the prior art, the rotors 11 and 12 are rotated by conventional means (not shown) on the respective axles 13 and 14 in the direction shown by the arrows on the respective rotors. Therefore, using the right-hand rule, the momentum vector of rotor 11 points in the negative $x$-direction (for convenience, space points will be defined by using the conventional $x$-$y$-$z$-coordinate system) and the momentum vector for rotor 12 points in the positive $x$-direction. Axle 13 is mounted on two gimbals 16 and 17 whereby each gimbal is free to rotate about the axis 13. The gimbals 16 and 17 are rotatably mounted to yokes 21 and 22, respectively. Gimbal 16 rotates with respect to yoke 21 along an axis that is parallel to a $y$-direction, while gimbal 17 rotates with respect to yoke 22 on an axis which is parallel to the $z$-direction. Yoke 21 is rotatably mounted to a sleeve 26 which is fixed to a fixed reference frame (schematically shown). Sleeve 26 being disposed parallel to the $z$-direction, while yoke 22 is rotatably mounted to sleeve 27 which is also fixably mounted to the frame and disposed parallel to the $y$-direction. Rotor 12 is mounted similarly to rotor 11 to respective gimbals 18 and 19 and yokes 23 and 24 and, in turn, to sleeves 28 and 29, as shown.

Fixed to the respective yokes 21, 22, 23, and 24 are gear segments 31, 32, 33, and 34. Gear segments 31 and 33 mesh together so that as one segment rotates clockwise about the respective sleeve the other rotates counterclockwise, and gear segments 32 and 34 mesh together so that also as one gear segment rotates clockwise about the respective sleeve the other rotates counterclockwise. Gear segments 31 and 33 may be rotated independently of gear segments 32 and 34. When gear segments 31 and 33 only are rotated, axles 13 and 14 rotate in the $x$-$y$ plane. This rotation of the axles causes the spin axes to also rotate so that an unbalanced momentum vector is parallel to the $y$-direction. Now when only gear segments 33 and 34 rotate, the reference frame rotates on an axis that is parallel to the $z$-direction. When the gear segment pair 31 and 33 is rotated together with gear segment pair 32 and 34, the frame will rotate on any axis that lies in the $y$-$z$ plane. The orientation of the axis is obviously determined by the magnitude and the direction of the rotation of each pair of gear segments. Thus, the arrangement disclosed teaches how to cause the frame to rotate on more than one axis. The number of axes about which the frame may rotate is infinite as long as the axes lie in the $z$-$y$ plane.

Figure 2:
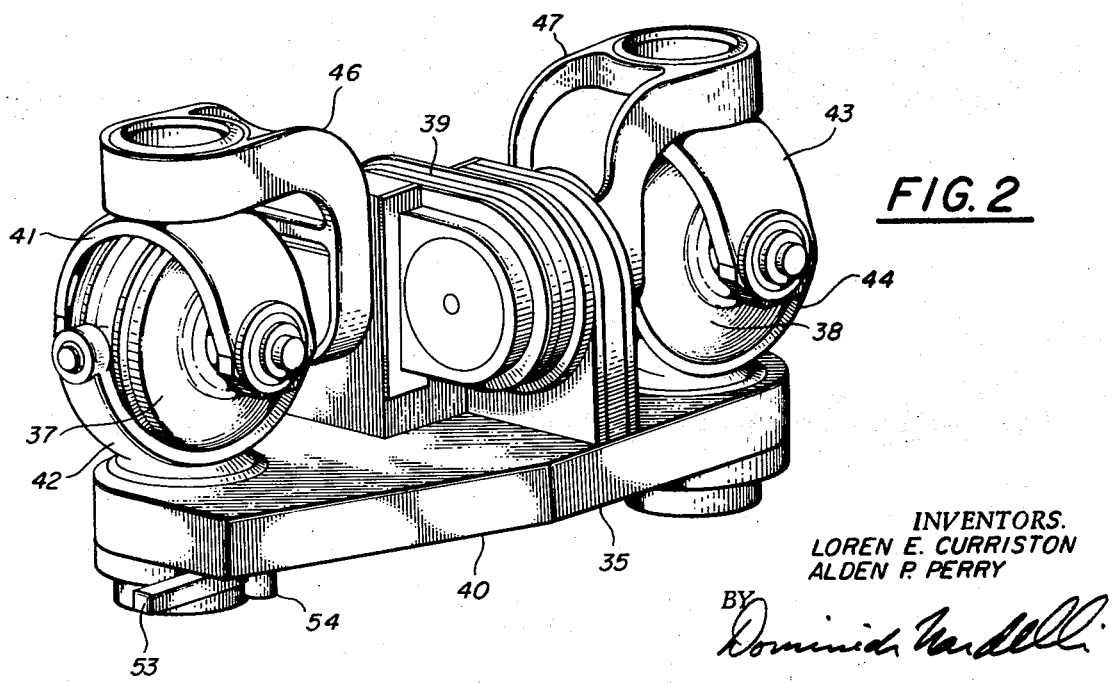
FIG. 2 is a pictorial view of the preferred embodiment of the frame incorporating the invention.
Figure 3:
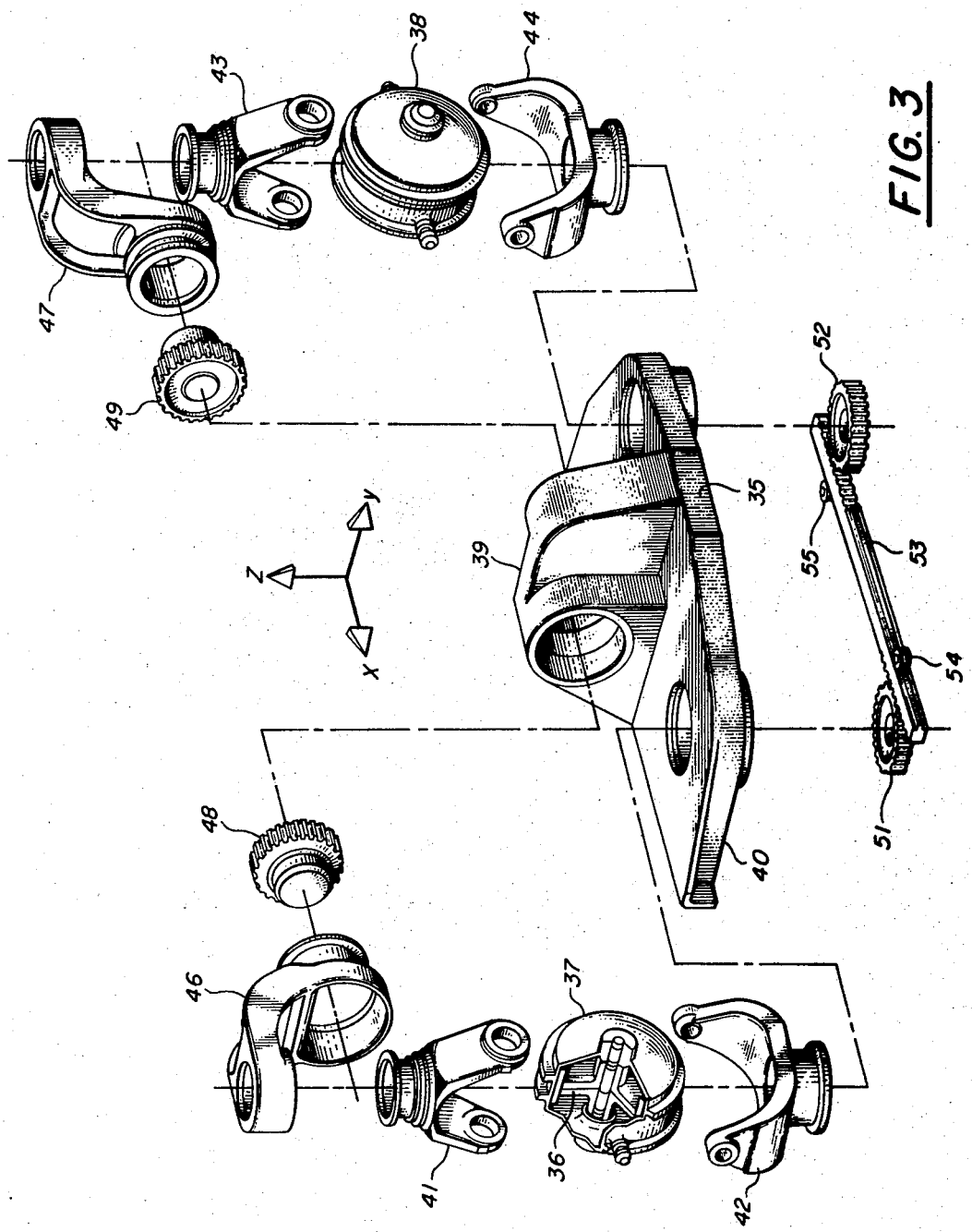
FIG. 3 is an exploded view of the embodiment shown in FIG. 2.

Referring to FIGS. 2 and 3, a preferred working embodiment of the novel torque generator is shown. Mounted on a fixed frame 35 are two rotors such as rotor 36, shown in FIG. 3. Each rotor is enclosed in respective housings 37 and 38. Housing 37 is mounted to forks 41 and 42 so that the housing 37 rotates with respect to the forks on mutually perpendicular axes. Housing 38 is similarly mounted to forks 43 and 44.

Forks 41 and 43 are rotatably mounted to yokes 46 and 47, respectively, which, in turn, are rotatably mounted to frame 35. Gears 48 and 49 are keyed to respective yokes 46 and 47 and meshed together within an appendage 39 on the frame 35; therefore, when yoke 46 rotates clockwise, yoke 47 rotates counterclockwise. Forks 42 and 44 are rotatably mounted to a base 40 as shown in the drawing. In order to enable one fork 42 to rotate clockwise while the other is rotating counterclockwise, the gears 51 and 52 are coupled together through a gear rack 53 which rides on pulleys 54 and 55 preventing the rack from disengaging the gears. This arrangement also allows the frame 35 to be rotated about more than one axis. These axes happen to be located in the $x-z$ plane due to the mounting arrangement of the forks 41, 42, 43, and 44 to the respective rotor housings 37 and 38.

Various changes in the schematic and to the form and relative arrangement of the preferred embodiment will now appear in those skilled in the art. Therefore, the invention is not limited to disclosed embodiments but limited to all embodiments coming within the scope of the claims.

What is claimed is:

1. A torque generator comprising:
   a frame,
   a pair of rotors, each rotor rotating on respective spin axes in substantially opposite directions and with identical inertia,
   first means for mounting each rotor of said pair on said frame to cause the respective spin axes to rotate within two crossing planes,
   second means for rotating the spin axis of one rotor of said pair in one direction and the spin axis of the other rotor of said pair in the counter-direction within one of said crossing planes, and
   third means for rotating the spin axis of said one rotor of said pair in one direction and the spin axis of said other rotor of said pair in the counter-direction within the other of said crossing planes to submit said frame to a torque about any axes lying in a plane perpendicular to said crossing planes.

2. The torque generator of claim 1 wherein:
   said crossing planes are perpendicular to each other.

3. The torque generator of claim 2 wherein first, second, and third means comprises:
   a first gimbal rotatably coupled to each rotor so that, when both of said gimbals are rotated, the respective spin axes are rotated within one of said planes; and
   a second gimbal rotatably coupled to each rotor so that, when both of said second gimbals are rotated, the respective spin axes are rotated within the other of said planes.

4. The torque generator of claim 3 wherein:
   one of said first gimbals and one of said second gimbals are mounted to the same rotor to rotate about the respective spin axis thereof, and
   yoke means are provided to cause each gimbal to also rotate about a fixed axis that is perpendicular to the respective spin axis.

5. The torque generator of claim 3 wherein:
   a housing is provided for enclosing each rotor,
   one of said first gimbals and one of said second gimbals are rotatably mounted to the same housing to rotate about mutually perpendicular axis,
   a first plate is provided on said frame in which said first gimbals are rotatably mounted,
   a first gear is mounted on each of said first gimbals,
   a gear rack engaging each of said gears to cause said first gimbals to rotate counter to each other,
   a second plate is provided on said frame and mounted perpendicular to said first plate,
   a yoke rotatably mounted to said second plate and to each of said second gimbals,
   a second gear is mounted to each of said yokes, and said second gears mesh together to cause said yokes to rotate counter to each other.

* * * * *